(12) United States Patent
Jarrad et al.

(10) Patent No.: US 7,127,681 B1
(45) Date of Patent: Oct. 24, 2006

(54) METHOD FOR MANAGING CONTENTS OF A WEB SITE

(75) Inventors: Ken Jarrad, London (GB); Greg Wilkins, London (GB); Nathan Sowatskey, London (GB); Mark Paul Andrews, Groton, MA (US); Ian Cotton, Reading (GB); Mike Manning, Weybridge (GB)

(73) Assignee: Cisco Technology Inc., San Jose, CA (US)

( * ) Notice: Subject to any disclaimer, the term of this patent is extended or adjusted under 35 U.S.C. 154(b) by 695 days.

(21) Appl. No.: 10/241,302

(22) Filed: Sep. 10, 2002

(51) Int. Cl.
*G06F 3/00* (2006.01)
*G06F 3/14* (2006.01)

(52) U.S. Cl. ...................... 715/760; 715/746
(58) Field of Classification Search ............... 715/760, 715/746
See application file for complete search history.

(56) References Cited

U.S. PATENT DOCUMENTS 6,023,714 A * 2/2000 Hill et al. ................... 715/513
6,560,639 B1 * 5/2003 Dan et al. ................... 709/218
2002/0161802 A1 * 10/2002 Gabrick et al. ............. 707/517

* cited by examiner

*Primary Examiner*—Kieu D. Vu (57) ABSTRACT

A method for managing contents of a web site. A request to access a web site is received from a requestor, wherein the web site comprises a sparse tree directory comprising elements used to build the web site. The sparse tree directory comprises a web site page hierarchy located at the root directory of a shape hierarchy, wherein the web site page hierarchy comprises a directory structure of the web application and the shape hierarchy defines user shapes accommodated by the web application. The sparse tree directory also comprises a first subdirectory corresponding to a first value of a dimension and a second subdirectory corresponding to a second value of the dimension, wherein the first subdirectory comprises a first element and the second subdirectory comprises a second element. A shape of the requestor is generated, wherein the shape defines elements that can be accommodated by the requestor. The sparse tree directory is cached. The sparse tree directory is searched for elements defined by the shape. A response to the request is created based on the shape.

36 Claims, 7 Drawing Sheets

| Dimension | Directory Path |
|---|---|
| A (devices dimension) | /desktop |
| B (brand dimension) | /personal |
| C (locales dimension) | /japanese |

| Search order | Directory Path (from document root) | Path Assembly |
|---|---|---|
| 1 | desktop/personal/japanese | A/B/C |
| 2 | desktop/personal | A/B |
| 3 | desktop/japanese | A/C |
| 4 | desktop | A |
| 5 | personal/japanese | B/C |
| 6 | personal | B |
| 7 | japanese | C |
| 8 | none (document root) | none (document root) |

Figure 7B

METHOD FOR MANAGING CONTENTS OF A WEB SITE

FIELD OF INVENTION

The present invention relates to the field of web applications. Specifically, the present invention relates to a method for managing contents of a web site.

BACKGROUND OF THE INVENTION

Over the last two decades, the use of the Internet and the World Wide Web has expanded to virtually every corner of the world. Web pages provide forums to communicate with a large audience, whether it is to provide news and information, to facilitate commerce, or to simply provide enjoyment. Due to the global nature of the Internet, a typical web application can be accessed by a multitude of devices from a multitude of locales using different types of web site browsers. Further complicating the matter, devices and browsers may be customized to control the presentation of a web page. A document root of the web application contains the elements that make up the presentation of a web page on a browser. A document root is the file system that contains the elements (e.g., HTML and GIF files) of a web application. In a web server, the document root is the file system used to build a web page.

As explained above, it is desirable for a web application to be capable of handling interaction with multiple determining factors, such as different types of devices, locales, brands, browsers, and the like. In essence, in order to ensure the broadest audience for a web application, it is necessary for a web application to be able to deal with multiple instances of any determining factors that might affect the presentation or composition of web pages of the web application. Currently, a web application typically has a completely separate document root for each combination of determining factors for use in presenting the web pages of the web application. There are several problems associated with having multiple document roots for a web application.

For one, creating the contents of multiple document roots consumes a large amount of overhead. For example, consider an instance where a web application is intended for presentation on two different types of devices (e.g., a desktop computer and a handheld computer) supporting two different locales (e.g., English and Japanese) and two different browsers (e.g., Microsoft Explorer and Netscape Navigator). There are eight possible combinations of determining factors, each requiring its own document root. Since a web application may be intended for presentation on many different types of devices supporting many different locales and browser types, a web application may require hundreds of document roots to facilitate web page presentation. It can require substantial resources to create the required document roots.

Furthermore, while there are probably differences among several, if not all document roots of a web application, typically many elements are duplicated across several document roots. If an element needs to be changed, and it is duplicated across many document roots, it must be changed in every instance. As explained above, for web applications with a large number of document roots this can be substantially resource intensive, both financially and technically. In some instances, the effort to track duplicate elements and change them may be prohibitively expensive.

Currently, in order to limit the creation and maintenance time for document roots, a typical web application limits the combination of determining factors that it can be presented on. Unfortunately, this can substantially limit the viability of a web application by limiting the number of potential accesses. As the number of different types of devices and other determining factors continues to expand due to technical innovations, the number of potential accesses will continue to decrease.

Accordingly, a need exists for a method that provides for easy creation of document roots for a web application that requires less personnel and financial resources than currently required. Furthermore, a need exists for a method that satisfies the above need, and provides for easy maintenance of document roots of a web application. Also, a need exists for a method that satisfies the above needs, and provides for easy creation and maintenance of document roots for a wide array of determining factors.

SUMMARY OF THE INVENTION

Embodiments of the present invention provide a method for easy creation of a sparse tree directory structure for a web application requiring reduced personnel and financial resources. Furthermore, embodiments of the present invention provide a method for easy maintenance of a sparse tree directory structure. Also, embodiments of the present invention provide a method for easy creation and maintenance of a sparse tree directory structure for a wide array of determining factors.

A method for managing contents of a web site is presented. A request to access a web site is received from a requestor, wherein the web site comprises a sparse tree directory comprising elements used to build the web site. A shape of the requestor is generated, wherein the shape defines elements that can be accommodated by the requestor. The sparse tree directory is cached per session. The sparse tree directory is searched for elements defined by the shape. A response to the request is created based on the shape. In one embodiment, the response comprises a portion of elements of the sparse tree directory, wherein the portion of elements comprises elements most closely matching the shape.

In one embodiment, the sparse tree directory comprises a web site page hierarchy located at the root directory of a shape hierarchy, wherein the web site page hierarchy comprises a directory structure of the web application and the shape hierarchy defines user shapes accommodated by the web application. In one embodiment, the sparse tree directory also comprises a first subdirectory corresponding to a first value of a dimension and a second subdirectory corresponding to a second value of the dimension, wherein the first subdirectory comprises a first element and the second subdirectory comprises a second element.

In one embodiment, the elements are web resources. In one embodiment, the shape comprises a plurality of dimensions defining which web resources can be accommodated by the requestor. In one embodiment, a dimension is a device type of the requestor. In another embodiment, a dimension is a browser type of the requestor. In another embodiment, a dimension is a locale of the requestor.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

A method for managing contents of a web site is presented. Embodiments of the present invention provide a method for easy creation of a sparse tree directory structure for a web application requiring reduced personnel and financial resources. Furthermore, embodiments of the present invention provide a method for easy maintenance of the sparse tree directory structure. Also, embodiments of the present invention provide a method for easy creation and maintenance of a sparse tree directory structure for a wide array of dimensions.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "generating", "caching", "searching", "creating", "placing", or the like, refer to the actions and processes of a computer system, or similar electronic computing device, such as a bridging device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
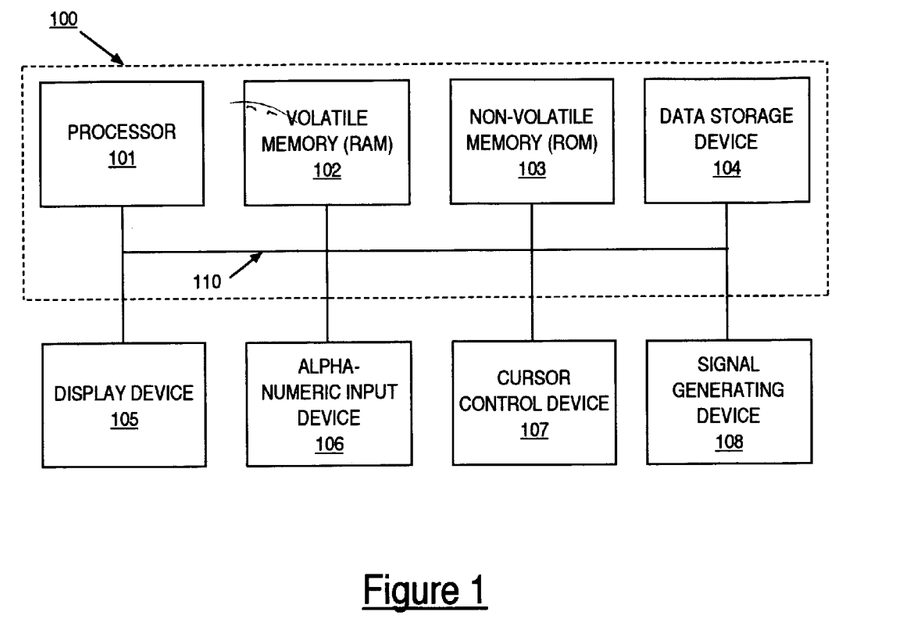
FIG. 1 is a block diagram of an exemplary computer system platform upon which embodiments of the present invention may be practiced.

Exemplary Hardware Upon which Embodiments of the Present Invention May be Implemented Refer now to FIG. 1 which illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
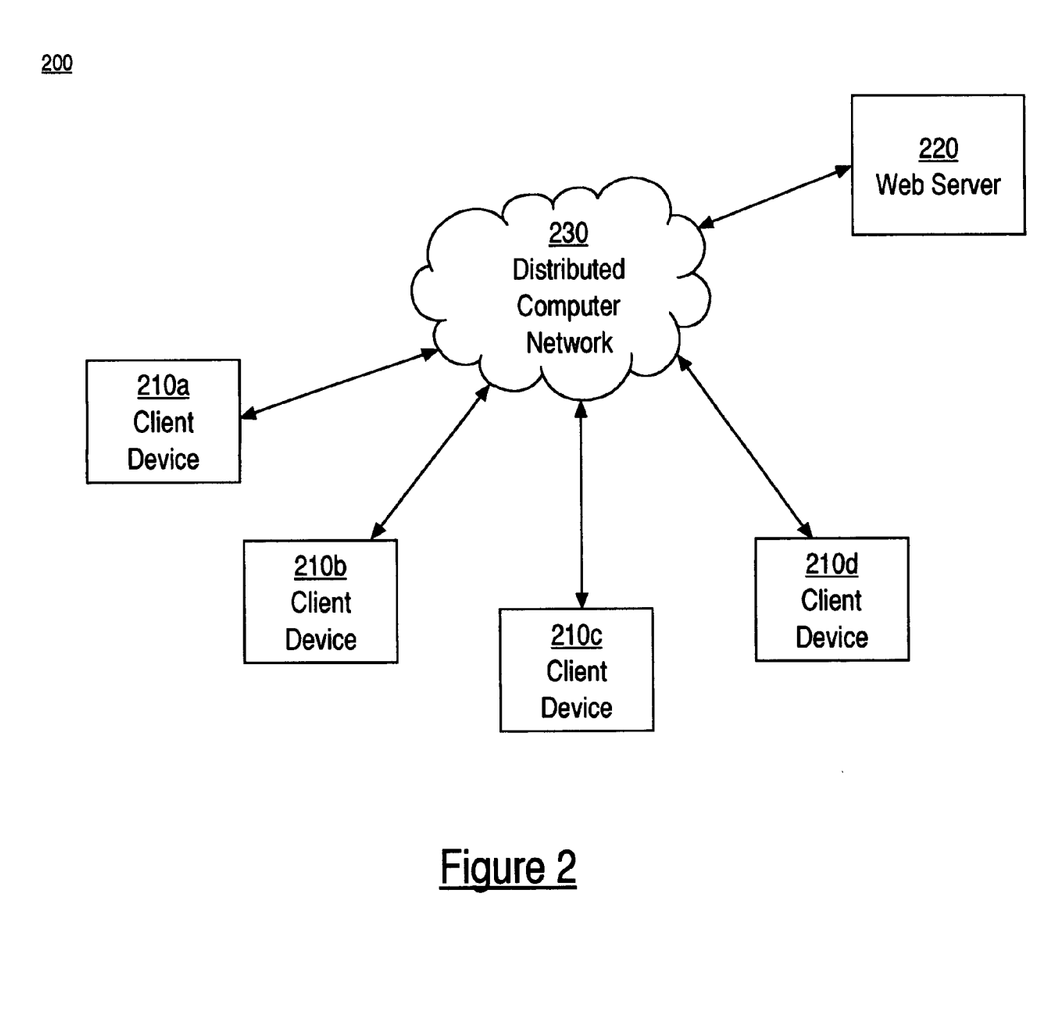
FIG. 2 is a block diagram of one embodiment of a computer system network upon which the present invention may be practiced.

Referring now to FIG. 2, a block diagram of a computer system network 200 upon which the present invention may be practiced is shown. As depicted in FIG. 2, system 200 comprises a plurality of client devices 210a–d communicatively coupled to web server 220 via a distributed computer network 230. In one embodiment, client devices 210a–d communicate with web server 220 to access web applications (e.g., web sites) stored on web server 220. In one embodiment, web server 220 performs a method for managing contents of a web site (e.g., process 600 of FIG. 6). Client devices 210a–d communicate with web server 220 via the communications protocols of distributed computer network 230, hereafter referred to as network 230. It should be appreciated that client device 210a–d can comprise any number or combination of electronic devices, including but not limited to: desktop computer systems, laptop computer systems, handheld computer systems, or any electronic device capable of accessing and displaying web sites.

Referring still to FIG. 2, network 230 includes well know network technologies. For example, network 230 can be implemented using LAN technologies (e.g., Ethernet, Tokenring, etc.), the Internet, or other wired or wireless network technologies. The communications links between web server 220, client devices 210a–d and network 230 can be implemented using, for example, a telephone circuit, communications cable, optical cable, wireless link, or the like.

A Method for Managing the Contents of a Web Site

Figure 3:
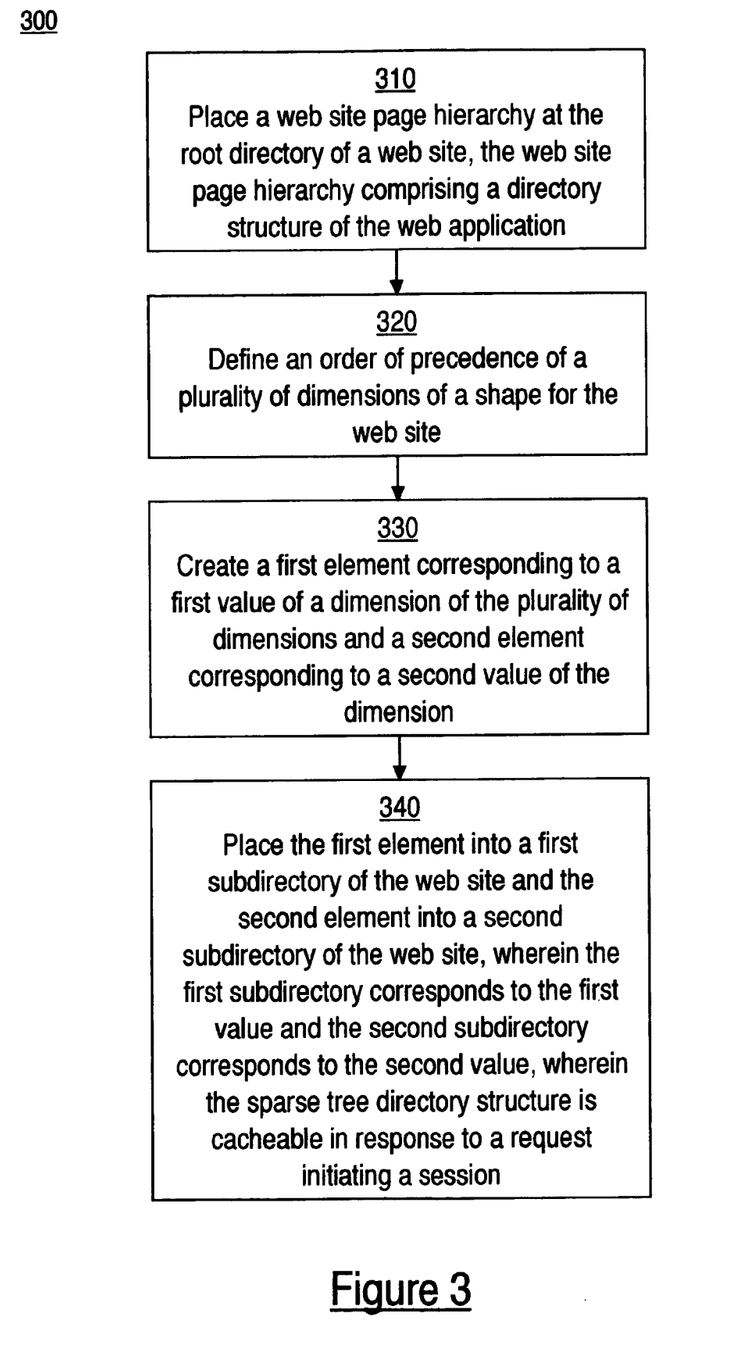
FIG. 3 is a flowchart diagram illustrating steps of a process for generating a sparse tree directory in accordance with one embodiment of the present invention.

FIG. 3 is a flowchart diagram illustrating steps of a process 300 for generating a sparse tree directory in accordance with one embodiment of the present invention. In one embodiment, process 300 is carried out by processors and electrical components under the control of computer readable and computer executable instructions. Although specific steps are disclosed in process 300, such steps are exemplary. That is, the embodiments of the present invention are well suited to performing various other steps or variations of the steps recited in FIG. 3.

Figure 4:
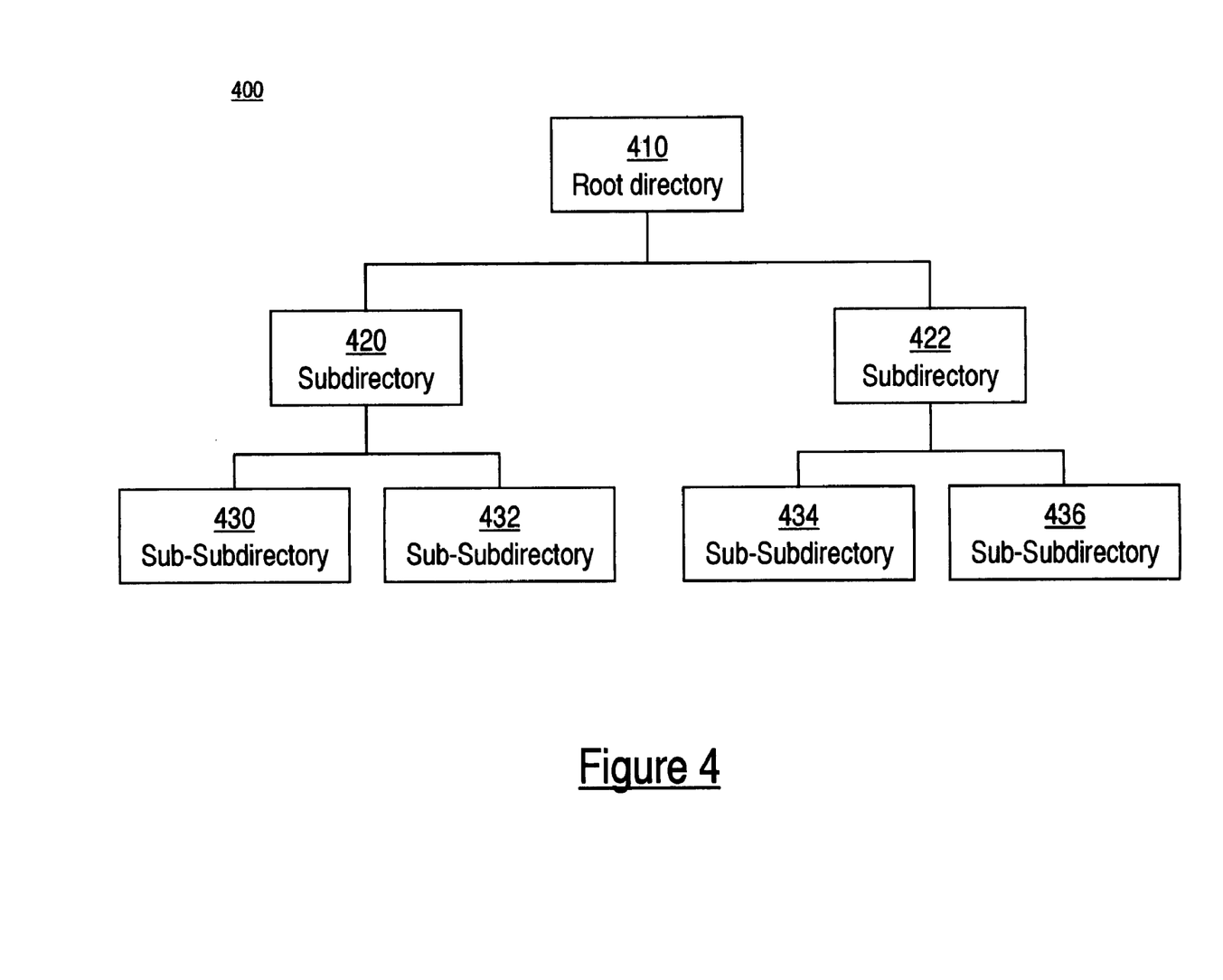
FIG. 4 is a block diagram of an exemplary web site page hierarchy in accordance with one embodiment of the present invention.

At step 310 of process 300, a web site page hierarchy is placed at the root directory of a web site. A web site page hierarchy is the directory structure of a conventional web application (e.g., web site). In one embodiment, the web site page hierarchy comprises a single copy of each web resource (e.g., element) needed by the web site. FIG. 4 is a block diagram of an exemplary web site page hierarchy 400 in accordance with one embodiment of the present invention.

Web site page hierarchy 400 of FIG. 4 comprises a root directory 410, subdirectories 420 and 422, sub-subdirectories 430 and 432 corresponding to subdirectory 420, and sub-subdirectories 434 and 436 corresponding to subdirectory 422. In one embodiment, each of the directories of web site page hierarchy 400 comprises at least one web resource. It should be appreciated that a web resource is any file for use in presenting a web page of a web site. For example, a web resource may be an HTML file, a GIF image, a Java server page (JSP), or any other web application component. It should be further appreciated that a web site page hierarchy can comprise any number of directories, subdirectories and sub-subdirectories, and is not limited to the directory structure of the present embodiment, as the present embodiment is exemplary in nature.

At step 320 of FIG. 3, an order of precedence of a plurality of dimensions of a shape is defined. A shape is a set of dimensions that defines the web resources available to a specific user. A dimension represents one aspect of the interaction of the user with the web site. The shape of a user can comprise dimensions including, but not limited to: the type of device, the operating system of the device, the type of browser, a brand for the web site (e.g., a brand for business use and a brand for personal use), a locale for the web site (e.g., language), and other personalizations for the web site for a specific user. It should be appreciated that the dimensions that define a shape may be application-specific and can include other dimensions beyond those listed above.

Figure 5:
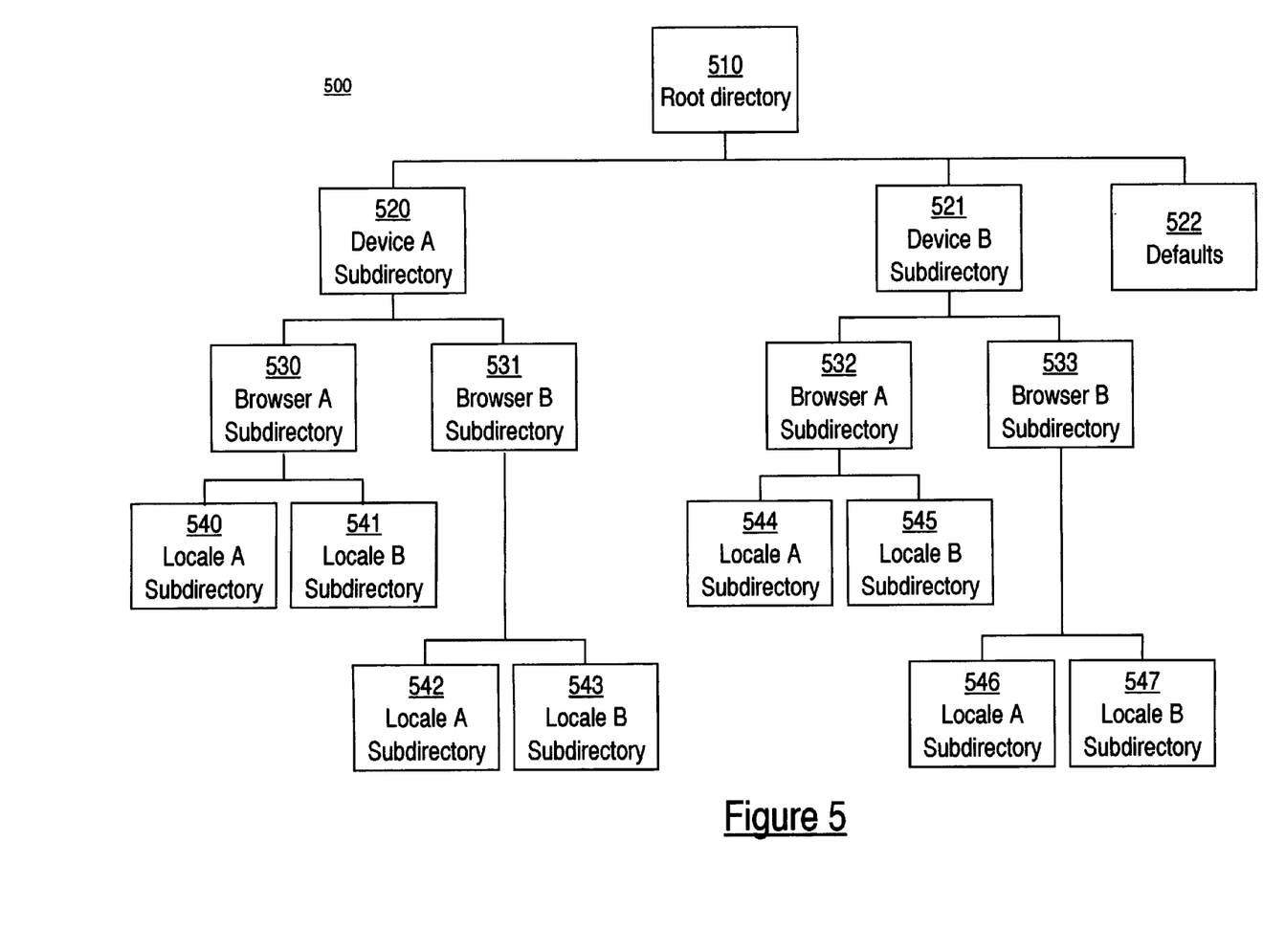
FIG. 5 is a block diagram of an exemplary shape hierarchy in accordance with one embodiment of the present invention.

FIG. 5 is a block diagram of an exemplary shape hierarchy 500 in accordance with one embodiment of the present invention. Shape hierarchy 500 comprises a root directory 510, and a plurality of subdirectories for a corresponding dimension, where each dimension has a plurality of values. A subdirectory is configured to comprise elements pertaining to a particular value of a dimension. The ordering of the dimensions is relative to the desired order of precedence of the dimensions. The order of precedence defines a search order for elements by starting with the first dimension (e.g., top subdirectory of shape hierarchy 500) and moving through the dimensions in order. In the present embodiment, shape hierarchy 500 comprises an order of precedence of device, browser, and locale. Hence, shape hierarchy 500 comprises device subdirectories (e.g., subdirectories 520 and 521), browser subdirectories (e.g., subdirectories 530–533), and locale subdirectories (e.g., subdirectories 540–547). Shape hierarchy 500 also comprises defaults 522, wherein defaults 522 comprises default elements (e.g., elements not otherwise located in a subdirectory of shape hierarchy 500).

With respect to device subdirectories, device A subdirectory 520 and device B subdirectory 521 correspond to different types of devices. For example, device A subdirectory 520 may correspond to a desktop computer and device B subdirectory 521 may correspond to a handheld computer. Likewise, with respect to browser subdirectories, browser A subdirectory 530 and browser B subdirectory 531 (as well as browser A subdirectory 532 and browser B subdirectory 533) correspond to different browser types. For example, browser A subdirectory 530 may correspond to a Netscape browser and browser B subdirectory 531 may correspond to a Microsoft browser. It should be appreciated that browser A subdirectory 530 and browser A subdirectory 532 may comprise different web resources because browser A subdirectory 530 corresponds to device A and browser A subdirectory 532 corresponds to device B. It should be further appreciated that a shape hierarchy 500 can comprise any number of directories, subdirectories and sub-subdirectories, and is not limited to the present embodiment, as the present embodiment is exemplary in nature.

With reference to FIG. 3, at step 330, a first element and a second element for the same corresponding dimension are created. In one embodiment, the first element corresponds to a first value of the dimension and the second element corresponds to a second value of the dimension. In one embodiment, the first element and the second element are web resources. For example, a web site developer may wish to create a corporate logo for use in different types of devices, such as a desktop computer system and a handheld computer system. Since a typical desktop computer system has a larger display than a typical handheld computer system, the logo for use in the desktop computer system may be 32 by 32 pixels, while the logo for use in the handheld computer system may be 16 by 16 pixels.

At step 340, the first element is placed into a first subdirectory of the shape hierarchy and the second element into a second subdirectory of the shape hierarchy, wherein the first subdirectory and the second subdirectory correspond to different values for the same dimension. Continuing the example discussed above at step 330, the logo for use in the desktop computer system is placed in the desktop subdirectory, while the logo for use in the handheld computer system is placed in the handheld subdirectory.

The sparse tree directory structure of the present invention comprises subdirectories corresponding to different values of dimensions. It should be appreciated that where all web resources are the same across all values of a dimension, the dimension will be in the default directory (e.g., defaults 522 of FIG. 5) of the sparse tree directory. In one embodiment, an instance of each web resource may exist in each subdirectory for a dimension. In another embodiment, an instance of a web resource exists only in the subdirectories for a dimension in which it is different from the web resource for the dimension existing in the root directory. As such, embodiments of the present invention only require multiple instances of a web resource where the web resource differs depending on the value of a dimension. Furthermore, it should be appreciated that the sparse tree directory is cacheable in response to a request to access a web page of a web site.

Figure 6:
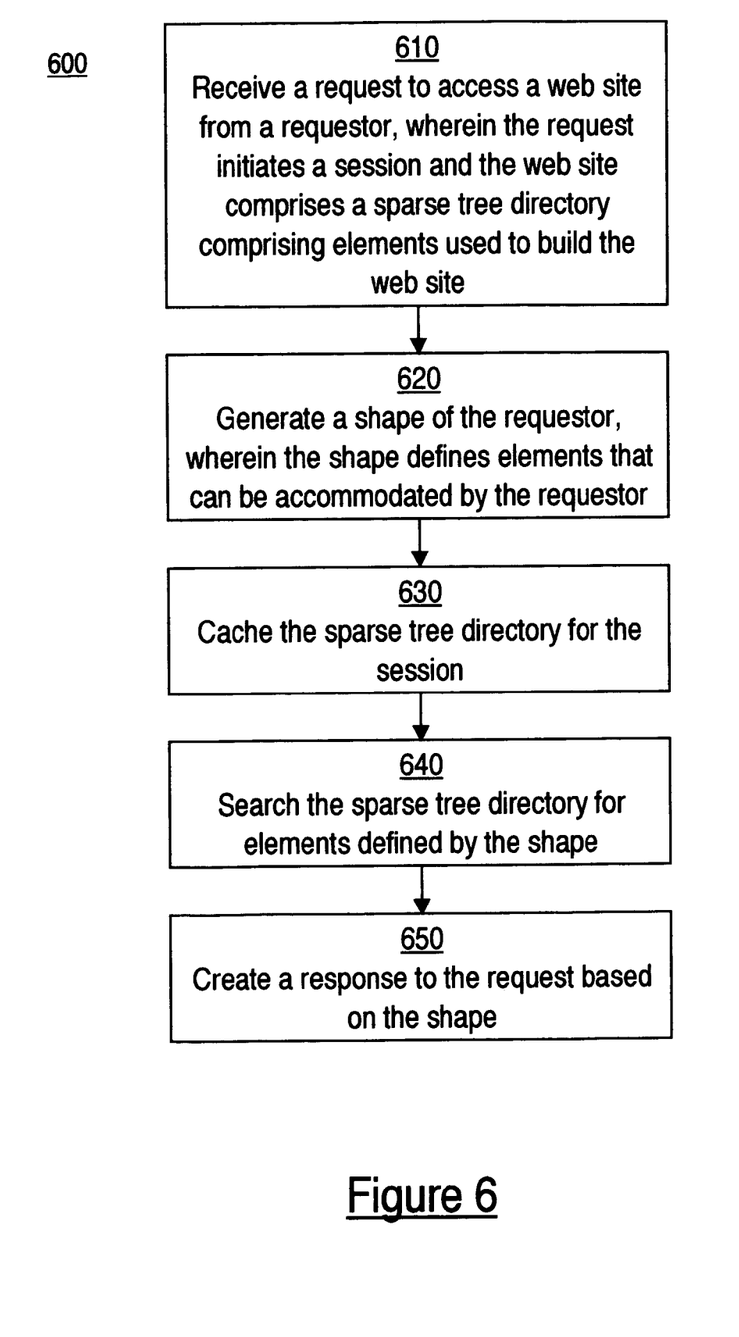
FIG. 6 is a flowchart diagram illustrating steps of a process for managing contents of a web site in accordance with one embodiment of the present invention.

FIG. 6 is a flowchart diagram illustrating steps of a process 600 for managing contents of a web site in accordance with one embodiment of the present invention. In one embodiment, process 600 is carried out by processors and electrical components under the control of computer readable and computer executable instructions. Although specific steps are disclosed in process 600, such steps are exemplary. That is, the embodiments of the present invention are well suited to performing various other steps or variations of the steps recited in FIG. 6.

At step 610 of process 600, a request to access a web site is received from a requester, wherein the request initiates a session and the web site comprises a sparse tree directory. The sparse tree directory comprises elements used to build the web site. In one embodiment, the elements are web resources. In one embodiment, the requestor is a user operating a client device (e.g., client device 210a of FIG. 2) and the request is received at a web server (e.g., web server 220 of FIG. 2).

In one embodiment, the sparse tree directory comprises a web site page hierarchy located at the root directory of a shape hierarchy, wherein the web site page hierarchy comprises a directory structure of the web application and wherein the shape hierarchy defines user shapes accommodated by the web application. The sparse tree directory also comprises a first subdirectory corresponding to a first value of a dimension, wherein the first subdirectory comprises a first element, and a second subdirectory corresponding to a second value of the dimension, wherein the second subdirectory comprises a second element.

At step 620, a shape of the requestor is generated, wherein the shape defines elements that can be accommodated by the requestor. As described above, a shape is a set of dimensions that defines the web resources available to a specific user, wherein a dimension represents one aspect of the interaction of the user with the web site. In one embodiment, the shape comprises a plurality of dimensions defining which web resources can be accommodated by the requester.

In one embodiment, the web server communicates with a browser of a client device used by the requestor using http. A JavaScript probe is transmitted from the web server to the browser, and executes on the browser. The JavaScript probe allows the web server to determine information defining the client environment for the user. In one embodiment, the probe determines values of dimensions for the requestor. For example, the probe can determine the type of device, the browser type, the operating system, and any other necessary information (e.g., information pertaining to a dimension) necessary to determine the shape of the requester. Upon determining the required information, the probe returns the information to the web server. In one embodiment, the web server uses the probe information and other information (e.g., a client IP address) to generate the dimensions of the shape for a given session. It should be appreciated that the shape generation occurs the first time a request is made for a given http session, and the shape is retained for the session.

At step 630, the sparse tree directory is cached for the session. In one embodiment, the session is a hypertext transfer protocol (http) session. In another embodiment, the session is a web application session. Caching the sparse tree directory for a session provides for faster access of the sparse tree directory for use in generating a response. In particular, caching the sparse tree directory for an http session also accounts for a shape change (e.g., a different browser or brand is used).

Figure 7A:
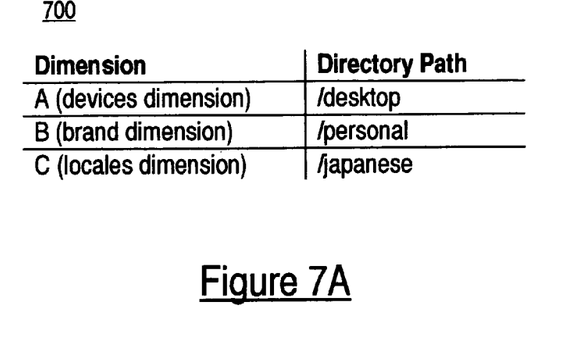
FIG. 7A is a table illustrating an exemplary dimensions array in accordance with one embodiment of the present invention.

At step 640, the sparse tree directory is searched for elements defined by the shape. In one embodiment, a plurality of directory paths are specified, wherein each path corresponds to one dimension of the shape. The sparse tree directory establishes the order of precedence of the dimensions, wherein a parent directory precedes its subdirectory. For example, consider a sparse tree directory having the order of precedence of device, brand, and locale. For a user with the shape "desktop, personal, Japanese", a directory path associated with each dimension is specified. FIG. 7A is a table 700 illustrating an exemplary dimensions array for a user shape of "desktop, personal, Japanese", in accordance with one embodiment of the present invention. For purposes of simplicity, and so as not to obscure the understanding of the present invention, the dimensions "desktop, personal, Japanese" are designated as "A, B, C", respectively.

Figure 7B:
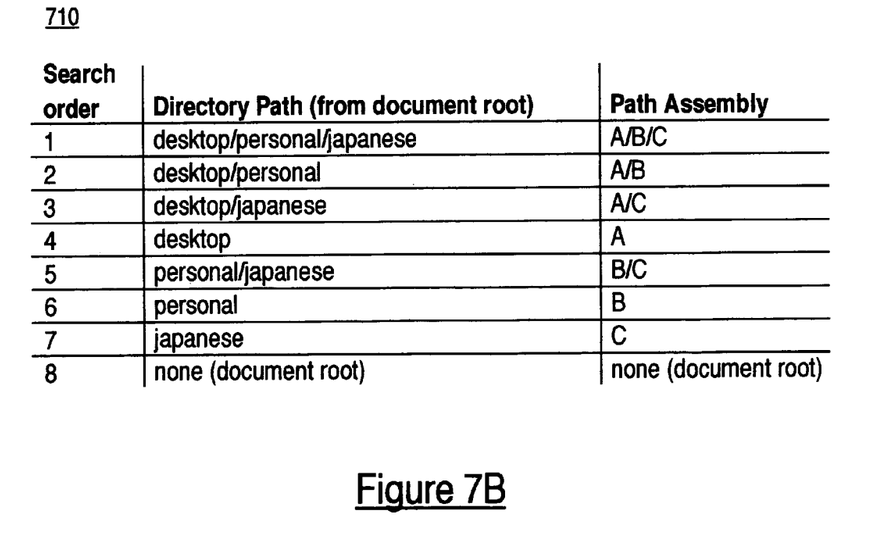
FIG. 7B is a table illustrating an exemplary search order in accordance with one embodiment of the present invention.

A search is performed based on the order of precedence as established in the dimensions array. FIG. 7B is a table 710 illustrating an exemplary search order in accordance with one embodiment of the present invention. The first directory path searched is path A/B/C. If the element is found at path 1, that resource is used in response to the request. If the element is not found at path 1, the search for the element continues at path 2. If the element is found at path 2, that resource is used in response to the request. If the element is not found at path 2, the search for the element continues as shown in table 710.

It should be appreciated that the order of precedence of the dimensions in the dimension array controls the assembly of the directory paths for the search. Essentially, the dimension array provides a list of dimensions in order of preference, and these dimensions are used to detect the best fit for an available element to the required element of a particular shape.

At step 650, a response to the request is created based on the shape. As described at step 640, those elements located in searching the sparse directory tree as defined by the shape are used to create the response. In one embodiment, the response comprises a portion of elements of the sparse tree directory, wherein the portion of elements comprises elements exactly match the shape. A response is generated dynamically based on the order of precedence of the dimensions. For example, the elements are located at step 1 of table 710 of FIG. 7B. In another embodiment, the response comprises a portion of elements of the sparse tree directory, wherein the portion of elements comprises elements most closely matching the shape. For example, some elements are located at step 2 of table 710 of FIG. 7B.

The preferred embodiment of the present invention, a method for managing contents of a web site, is thus described. While the present invention has been described in particular embodiments, it should be appreciated that the present invention should not be construed as limited by such embodiments, but rather construed according to the below claims.

What is claimed is:

1. A method for managing contents of a web site, said method comprising:
   receiving a request to access a web site from a requestor, said request initiating a session, said web site comprising a sparse tree directory comprising elements used to build said web site wherein said sparse tree directory comprises a single root directory and a single copy of each element;
   generating a shape of said requester, said shape defining elements that can be accommodated by said requestor;
   caching said sparse tree directory for said session;
   searching said sparse tree directory for elements defined by said shape; and
   creating a response to said request based on said shape.

2. The method as recited in claim 1 wherein said sparse tree directory comprises:
   a web site page hierarchy located at the root directory of a shape hierarchy, said web site page hierarchy comprising a directory structure of said web application and said shape hierarchy defining user shapes accommodated by said web site;
   a first subdirectory corresponding to a first value of a dimension, said first subdirectory comprising a first element; and
   a second subdirectory corresponding to a second value of said dimension, said second subdirectory comprising a second element.

3. The method as recited in claim 1 wherein said response comprises a portion of elements of said sparse tree directory, said portion of elements comprising elements most closely matching said shape.

4. The method as recited in claim 1 wherein said elements are web resources.

5. The method as recited in claim 4 wherein said shape comprises a plurality of dimensions defining which said web resources can be accommodated by said requester.

6. The method as recited in claim 5 wherein a dimension of said plurality of dimensions is a device type of said requestor.

7. The method as recited in claim 5 wherein a dimension of said plurality of dimensions is a browser type of said requestor.

8. The method as recited in claim 5 wherein a dimension of said plurality of dimensions is a locale of said requestor.

9. The method as recited in claim 1 wherein said session is a hypertext transfer protocol (http) session.

10. A computer-readable medium having computer-readable program code embodied therein for causing a computer system to perform a method for managing contents of a web site, said method comprising:
    receiving a request to access a web site from a requester, said request initiating a session, said web site comprising a sparse tree directory comprising elements used to build said web site wherein said sparse tree directory comprises a single root directory and a single copy of each element;
    generating a shape for said requester, said shape defining elements that can be accommodated by said requester;
    caching said sparse tree directory for said session;
    searching said sparse tree directory for elements defined by said shape; and
    creating a response to said request based on said shape.

11. The computer-readable medium as recited in claim 10 wherein said sparse tree directory comprises a root directory comprising elements and at least one subdirectory, said subdirectory comprising elements that are different from elements of said root directory.

12. The computer-readable medium as recited in claim 10 wherein said response comprises a portion of elements of said sparse tree directory, said portion of elements comprising elements most closely matching said shape.

13. The computer-readable medium as recited in claim 10 wherein said elements are web resources.

14. The computer-readable medium as recited in claim 13 wherein said shape comprises a plurality of dimensions defining which said web resources can be accommodated by said requester.

15. The computer-readable medium as recited in claim 14 wherein a dimension of said plurality of dimensions is a device type of said requestor.

16. The computer-readable medium as recited in claim 14 wherein a dimension of said plurality of dimensions is a browser type of said requestor.

17. The computer-readable medium as recited in claim 14 wherein a dimension of said plurality of dimensions is a locale of said requestor.

18. The computer-readable medium as recited in claim 10 wherein said session is a hypertext transfer protocol (http) session.

19. A system for managing contents of a web site, said system comprising:
    means for receiving a request to access a web site from a requestor, wherein said request initiates a session and wherein said web site comprises a sparse tree directory comprising elements used to build said web site wherein said sparse tree directory comprises a single root directory and a single copy of each element;
    means for generating a shape for said requester, said shape defining elements that can be accommodated by said requester;
    means for caching said sparse tree directory for said session;
    means for searching said sparse tree directory for elements defined by said shape; and
    means for creating a response to said request based on said shape.

20. The system as recited in claim 19 wherein said sparse tree directory comprises a root directory comprising elements and at least one subdirectory, said subdirectory comprising elements that are different from elements of said root directory.

21. The system as recited in claim 19 wherein said response comprises a portion of elements of said sparse tree directory, said portion of elements comprising elements most closely matching said shape.

22. The system as recited in claim 19 wherein said elements are web resources.

23. The system as recited in claim 22 wherein said shape comprises a plurality of dimensions defining which said web resources can be accommodated by said requestor.

24. The system as recited in claim 23 wherein a dimension of said plurality of dimensions is a device type of said requester.

25. The system as recited in claim 23 wherein a dimension of said plurality of dimensions is a browser type of said requestor.

26. The system as recited in claim 23 wherein a dimension of said plurality of dimensions is a locale of said requester.

27. The system as recited in claim 19 wherein said session is a hypertext transfer protocol (http) session.

28. A computer system comprising:
a bus;
a memory unit coupled to said bus; and
a processor coupled to said bus, said processor for executing a method for managing contents of a web site, said method comprising:
receiving a request to access a web site from a requester, said request initiating a session, said web site comprising a sparse tree directory comprising elements used to build said web site wherein said sparse tree directory comprises a single root directory and a single copy of each element;
generating a shape of said requester, said shape defining elements that can be accommodated by said requester;
caching said sparse tree directory for said session;
searching said sparse tree directory for elements defined by said shape; and
creating a response to said request based on said shape.

29. The computer system as recited in claim 28 wherein said sparse tree directory comprises a root directory comprising elements and at least one subdirectory, said subdirectory comprising elements that are different from elements of said root directory.

30. The computer system as recited in claim 28 wherein said response comprises a portion of elements of said sparse tree directory, said portion of elements comprising elements most closely matching said shape.

31. The computer system as recited in claim 28 wherein said elements are web resources.

32. The computer system as recited in claim 31 wherein said shape comprises a plurality of dimensions defining which said web resources can be accommodated by said requester.

33. The computer system as recited in claim 32 wherein a dimension of said plurality of dimensions is a device type of said requestor.

34. The computer system as recited in claim 32 wherein a dimension of said plurality of dimensions is a browser type of said requestor.

35. The computer system as recited in claim 32 wherein a dimension of said plurality of dimensions is a locale of said requester.

36. The computer system as recited in claim 28 wherein said session is a hypertext transfer protocol (http) session.

* * * * *